(12) United States Patent
Xie et al.

(10) Patent No.: US 9,524,559 B2
(45) Date of Patent: Dec. 20, 2016

(54) IMAGE PROCESSING DEVICE AND METHOD

(71) Applicant: FUJITSU LIMITED, Kawasaki (JP)

(72) Inventors: Shufu Xie, Beijing (CN); Wei Liu, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/946,147

(22) Filed: Nov. 19, 2015

(65) Prior Publication Data
US 2016/0163059 A1 Jun. 9, 2016

(30) Foreign Application Priority Data

Dec. 4, 2014 (CN) .......................... 2014 1 0734194

(51) Int. Cl.
| | | |
|---|---|---|
| G06K 9/34 | (2006.01) | |
| G06T 7/00 | (2006.01) | |
| G06T 11/60 | (2006.01) | |
| G06T 5/00 | (2006.01) | |

(52) U.S. Cl.
CPC .............. *G06T 7/0081* (2013.01); *G06T 5/005* (2013.01); *G06T 11/60* (2013.01); *G06K 2209/01* (2013.01); *G06T 2207/10024* (2013.01); *G06T 2207/20144* (2013.01); *G06T 2207/30176* (2013.01)

(58) Field of Classification Search
CPC .................. G06T 2207/20144; G06T 7/0081; G06T 11/60; G06T 2207/10008; G06T 2207/10024; G06T 2207/30176; G06T 5/005; G06K 2209/01; G06K 9/00456; G06K 9/38; G06K 9/4652; H04N 1/642

USPC .................................................. 382/173, 175
See application file for complete search history.

(56) References Cited

U.S. PATENT DOCUMENTS

| | | | | |
|---|---|---|---|---|
| 2004/0096102 | A1* | 5/2004 | Handley ............ | G06K 9/00456 382/164 |
| 2005/0013502 | A1* | 1/2005 | Lim ................... | G06K 9/00456 382/254 |
| 2009/0002311 | A1* | 1/2009 | Barnhoefer .......... | G09G 3/3406 345/102 |
| 2013/0121573 | A1* | 5/2013 | Shen ........................ | G06K 9/38 382/166 |

\* cited by examiner

*Primary Examiner* — Kanjibhai Patel
(74) *Attorney, Agent, or Firm* — Staas & Halsey LLP

(57) ABSTRACT

An image processing device includes: an image acquiring unit for acquiring an image containing pixels; a picture searching unit for searching for a picture region in the image; a background acquiring unit for performing a background connected region acquiring operation on a non-picture region of the image in which the picture region is not included and the picture region respectively, to obtain a non-picture background connected region and a picture background connected region respectively; a foreground acquiring unit for removing the non-picture background connected region and the picture background connected region from the non-picture region and the picture region respectively, to obtain a non-picture foreground region of the non-picture region and a picture foreground region of the picture region respectively; and a merging unit for merging the non-picture foreground region of the non-picture region and the picture foreground region of the picture region to obtain an ultimate image foreground region.

19 Claims, 14 Drawing Sheets

IMAGE PROCESSING DEVICE AND METHOD

CROSS REFERENCE TO RELATED APPLICATIONS

This application claims the benefit of Chinese Application No. 201410734194.8, filed Dec. 4, 2014, the disclosures of which is incorporated herein by reference.

FIELD

The present disclosure relates to the field of image processing, and in particular to a device and method for removing show-through.

BACKGROUND

This section provides background information relating to the present disclosure, which is not necessarily prior art.

In some files which have words/pictures written or printed on both sides of one page, words or pictures shown-through from the back side will present in a background region of the front side due to the influence of the content of the back side. The similar phenomenon also exists in the back side, which is referred to as show-through or bleed-through, as shown in FIG. 1A and FIG. 1B. Generally, the show-through in the scanned file image is removed by the following two methods: removing the show-through only based on information of a single-side image; and removing the show-through based on information of two-side image. As compared with the former method, with the latter one, a foreground region of the file image will be obtained based on the information of the two-side image; and the show-through region can be removed accurately since more information is utilized. In the latter method, it is crucial to extract the foreground region of the file image efficiently.

As shown in FIG. 2A and FIG. 2B, a foreground layer of the file image includes two parts: pictures and words. The foreground layer of the image may be extracted using many conventional local/global binarization methods. For example, based on a set color or brightness threshold, image pixels are grouped into foreground pixels and background pixels. However, in these local/global binarization methods, only information on a single pixel or within a local region is utilized. In some picture regions of the file, a color of certain pixels is very close to a color of background pixels, and hence the certain pixels may be grouped as background pixels by mistake, thereby resulting in loss of foreground pixels. Although some of the methods may be used to locate a text line, but pictures in the image have complicated color distribution and irregular shapes, hence it is difficult to extract the foreground layer of the picture region efficiently using these methods. Therefore, the present disclosure will provide a solution for efficiently extracting the foreground region of the file.

SUMMARY

This section provides a general summary of the present disclosure, and is not a comprehensive disclosure of its full scope or all of its features.

An object of the present disclosure is to provide an image processing device and an image processing method, which includes: a foreground layer of a file image may be not located directly, and instead a background layer which may be located relatively easily is detected; and after the background layer is detected, the background layer is removed, thereby efficiently obtaining the foreground layer of the file image.

According to an aspect of the present disclosure, an image processing device is provided, which includes: an image acquiring unit configured to acquire an image containing pixels; a picture searching unit configured to search for a picture region in the image; a background acquiring unit configured to perform a background connected region acquiring operation on a non-picture region of the image in which the picture region is not included and the picture region, to obtain a non-picture background connected region and a picture background connected region respectively, where each of the pixels in the non-picture background connected region is defined as a non-picture background pixel, and each of the pixels in the picture background connected region is defined as a picture background pixel; a foreground acquiring unit configured to remove the non-picture background connected region and the picture background connected region from the non-picture region and the picture region respectively, to obtain a non-picture foreground region of the non-picture region and a picture foreground region of the picture region respectively, where each of the pixels in the non-picture foreground region is defined as a non-picture foreground pixel, and each of the pixels in the picture foreground region is defined as a picture foreground pixel; and a merging unit configured to merge the non-picture foreground region of the non-picture region and the picture foreground region of the picture region to obtain an ultimate image foreground region, where each of the pixels in the image foreground region is defined as an image foreground pixel.

According to another aspect of the present disclosure, an image processing method is provided, which includes: acquiring an image containing pixels; searching for a picture region in the image; performing a background connected region acquiring operation on a non-picture region of the image in which the picture region is not included and the picture region, to obtain a non-picture background connected region and a picture background connected region respectively, where each of the pixels in the non-picture background connected region is defined as a non-picture background pixel, and each of the pixels in the picture background connected region is defined as a picture background pixel; removing the non-picture background connected region and the picture background connected region from the non-picture region and the picture region respectively, so as to obtain a non-picture foreground region of the non-picture region and a picture foreground region of the picture region respectively, where each of the pixels in the non-picture foreground region is defined as a non-picture foreground pixel, and each of the pixels in the picture foreground region is defined as a picture foreground pixel; and merging the non-picture foreground region of the non-picture region and the picture foreground region of the picture region to obtain an ultimate image foreground region, where each of the pixels in the image foreground region is defined as an image foreground pixel.

According to another aspect of the present disclosure, a program product is provided, which has machine readable instruction code stored therein, where the instruction code, when read and executed by a computer, causes the computer to perform the image processing method according to present disclosure.

According to another aspect of the present disclosure, a machine readable storage medium is provided, on which the program product according to the present disclosure is carried.

With the image processing device and the image processing method according to the present disclosure, the file image may be divided into the candidate picture region and the non-candidate picture region; then the background layers of the candidate picture region and the non-candidate picture region are located; after the background layers are detected, the background layers are removed, thereby obtaining an initial foreground layer of the file image; and lastly, an ultimate foreground layer image is obtained by removing small noise from the initial foreground layer of the file, thereby efficiently obtaining the foreground layer of the file image.

The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1A:
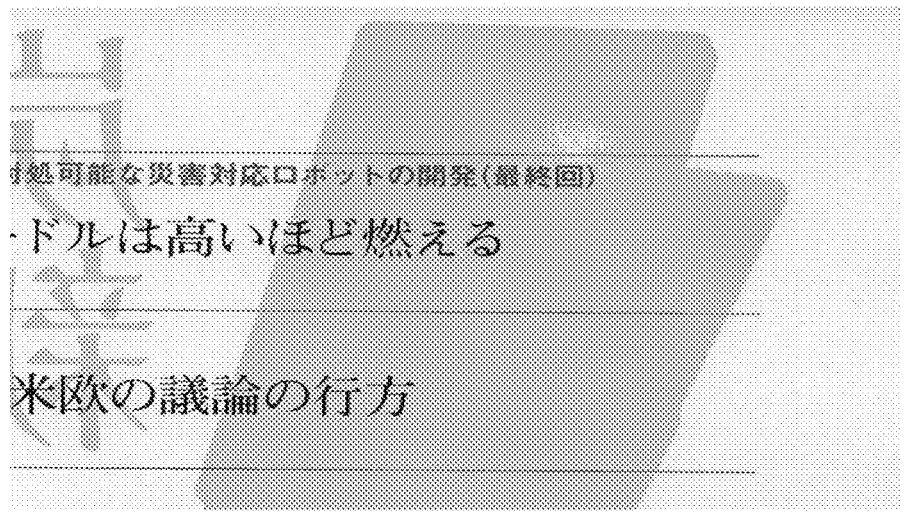
FIG. 1A and FIG. 1B show exemplary images presenting show-through according to a technical solution of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1B:
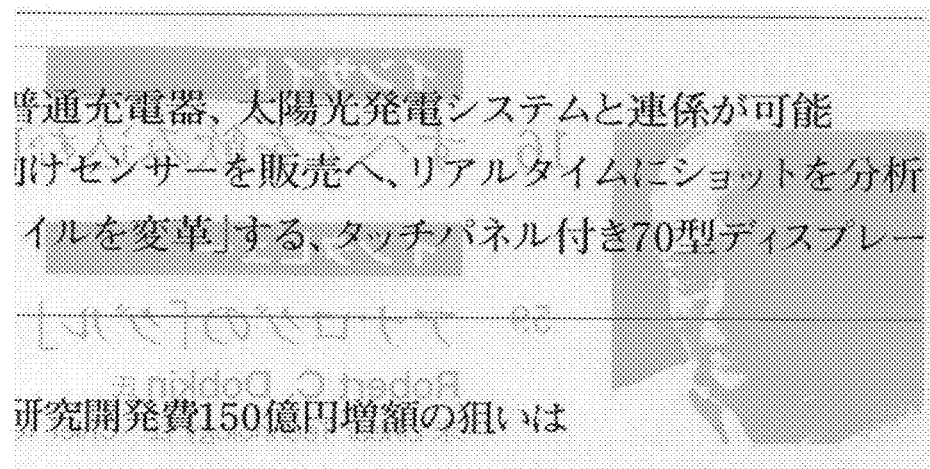

FIG. 1A and FIG. 1B show exemplary images presenting show-through according to a technical solution of the present disclosure. In scanning a file for example, generally the so-called show-through phenomenon occurs, i.e., a content of another page of the file can be seen in a page of the file. As shown in FIG. 1A and FIG. 1B, in a scanned image, there are both a normal image part composed of foreground pixels and a show-through image part composed of show-through pixels. Apparently, the presence of the show-through pixels severely influences readability of the file, thereby influencing automatic identification of characters. Hence, it is necessary to remove the show-through part from the scanned image.

Figure 2A:
FIG. 2A schematically shows an input image including a picture region and a word region.
Figure 2B:
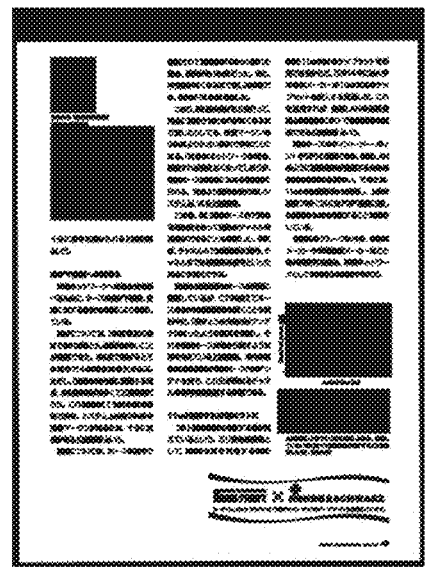
FIG. 2B shows a foreground layer of the input image shown in FIG. 2A.

As mentioned above, the show-through part is removed mainly based on information of a single-side image or information of a two-side image. In the second method, it is crucial to extract the foreground layer of the file image efficiently. FIG. 2A shows an input image including a picture region and a word region, and FIG. 2B shows a foreground layer of the input image. In FIG. 2B, a back pixel represents a foreground pixel, and a white pixel represents a background pixel. The foreground layer of the image may be extracted using many conventional local/global binarization methods. However, in these methods, only information on a single pixel or within a local region is utilized. In addition, in some picture regions of the file, a color of certain pixels is very close to a color of background pixels, hence the certain pixels may be grouped as background pixels by mistake, thereby resulting in loss of foreground pixels. Although some of the methods may be used to locate a text line, but pictures in the image have complicated color distribution and irregular shapes, hence it is difficult to extract the foreground layer of the picture region efficiently using these methods. Therefore, the present disclosure provides a solution for efficiently extracting the foreground region of the file.

According to the basic idea of the technical solution of the present disclosure, a foreground layer of an image is not located directly and instead a background layer which may be located relatively easily is detected; and after the background layer is detected, the background layer is removed, thereby obtaining the foreground layer of the image.

Figure 3:
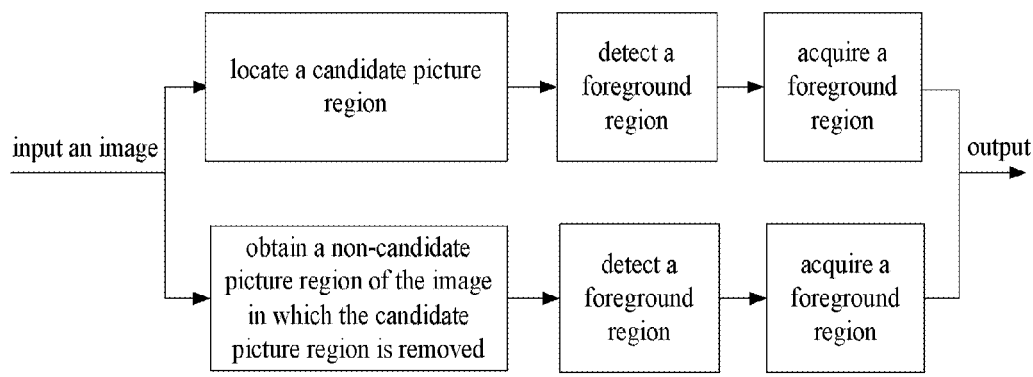
FIG. 3 is a flowchart of a basic idea according to a technical solution of the present disclosure.

FIG. 3 shows a flowchart according to the basic idea of the technical solution of the present disclosure. As shown in FIG. 3, a candidate picture region is located in an input image while obtaining a non-candidate picture region of the image in which the candidate picture region is removed. That is, the image here is divided into two parts: the candidate picture region and the non-candidate picture region. Subsequently, respective background regions are detected in the candidate picture region and the non-candidate picture region by performing connected region analysis. Then, background regions are removed from the candidate picture region and the non-candidate picture region to obtain the foreground regions of the candidate picture region and the non-candidate picture region respectively. Subsequently, the obtained foreground regions of the candidate picture region and the non-candidate picture region are merged (not shown) to output the foreground region of the input image.

The basic idea of the technical solution of the present disclosure is described briefly above. The technical solution of the present disclosure is further described in detail referring to the drawings hereinafter.

Figure 4:
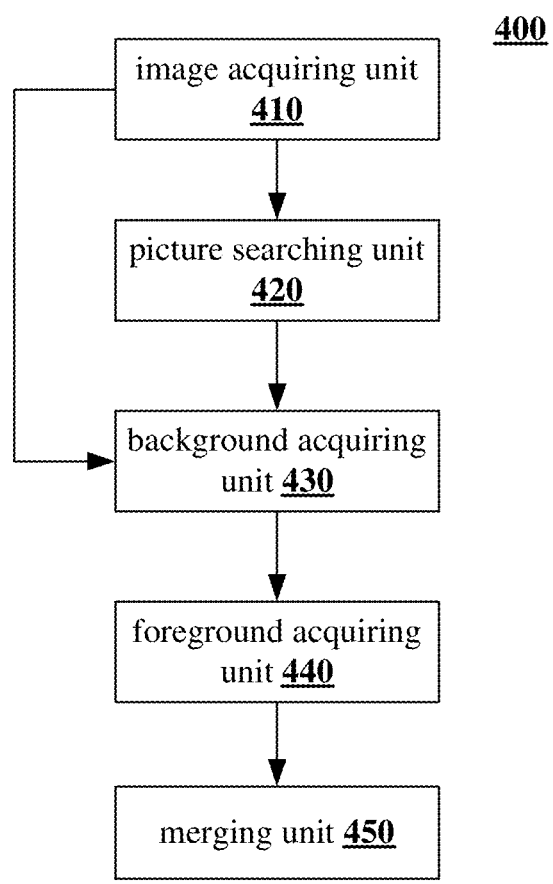
FIG. 4 is a block diagram of an image processing device according to an embodiment of the present disclosure.

FIG. 4 shows an image processing device 400 according to an embodiment of the present disclosure. As shown in FIG. 4, the image processing device 400 according to the embodiment of the present disclosure may include an image acquiring unit 410, a picture searching unit 420, a background acquiring unit 430, a foreground acquiring unit 440 and a merging unit 450.

The image acquiring unit 410 may be configured to acquire an image containing pixels, for example a given input image I(x, y).

Subsequently, the picture searching unit 420 may be configured to search for a picture region in the image. According to one embodiment of the present disclosure, the picture searching unit 420 may perform e.g. a connected region acquiring operation on the input image I(x, y) to obtain a picture region. In conjunction with FIG. 2A and FIG. 2B, the picture searching unit 420 may locate four pictures in FIG. 2A corresponding to four black shadow parts in FIG. 2B as picture regions, and locate a region other than the located picture regions as a non-picture region.

Subsequently, the background connected region acquiring unit 430 may be configured to perform a background connected region acquiring operation on a non-picture region of the image in which the picture region is not included and the picture region, to obtain a non-picture background connected region and a picture background connected region respectively. Each of the pixels in the non-picture background connected region is defined as a non-picture background pixel, and each of the pixels in the picture background connected region is defined as a picture background pixel. According to one embodiment of the present disclosure, it is assumed that the input image I(x, y) has a background in a uniform color: for the non-picture region of the input image, a connected region with a greater size may be located as a background connected region (hereinafter also referred to as $CC_{bg}$) of the non-picture region; and similarly, for the picture region of the input image, a connected region with a greater size may also be located as a background connected region of the picture region. In addition, during a process for acquiring the non-picture background connected region and the picture background connected region, a mark (e.g. 1 to n) of a connected region where each pixel belongs to may be assigned to the pixel.

Subsequently, the foreground acquiring unit 440 may remove the non-picture background connected region and the picture background connected region from the non-picture region and the picture region respectively, so as to obtain a non-picture foreground region of the non-picture region and a picture foreground region of the picture region. Each of the pixels in the non-picture foreground region may be defined as a non-picture foreground pixel, and each of the pixels in the picture foreground region may be defined as a picture foreground pixel. According to one embodiment of the present disclosure, for the non-picture region of the input image I(x, y), after the background connected region $CCb_g$ is located, background pixels in the background connected region $CC_{bg}$ may be removed to obtain an initial foreground image of the non-picture region, for example $Mask_{fore,init}$:

$$\text{Mask}_{fore,init}(x, y) = \begin{cases} 1, & \text{if } \text{label}(x, y) \neq \text{label}(bg) \\ 0, & \text{if } \text{label}(x, y) = \text{label}(bg) \end{cases}, \quad (1)$$

where label(bg) represents a mark of the background connected region $CC_{bg}$, and label(x, y) represents a mark of a connected region where the pixel(x, y) belongs to. Similarly, for the picture region of the input image I(x, y), after the background connected region is located, background pixels in the background connected region may be removed to obtain an initial foreground image of the picture region.

Then, the merging unit 450 may merge the non-picture foreground region of the non-picture region and the picture foreground region of the picture region to obtain an ultimate image foreground region. Each of the pixels in the image foreground region is defined as an image foreground pixel.

With the image processing device 400 shown in FIG. 4, a foreground layer of a file image may not be located directly and instead a background layer which may be located relatively easily is detected; after the background layer is detected, the background layer is removed, thereby efficiently obtaining the foreground layer of the file image.

Figure 5:
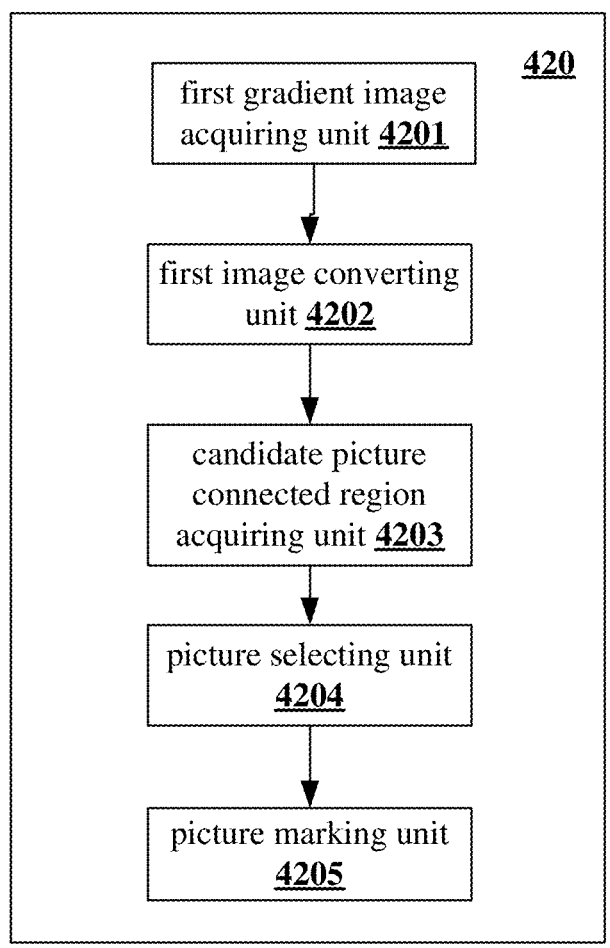
FIG. 5 is a block diagram of a part of an image processing device according to an embodiment of the present disclosure.

According to another embodiment of the present disclosure, as shown in FIG. 5, the picture searching unit 420 may also include a first gradient image acquiring unit 4201, a first image converting unit 4202, a candidate image connected region acquiring unit 4203, a picture selecting unit 4204 and a picture marking unit 4205.

The first gradient image acquiring unit 4201 may be configured to acquire a gradient image of an image based on pixel information of the image. According to one embodiment of the present disclosure, for a given input image I(x, y), the first gradient image acquiring unit 4201 may calculate a corresponding gradient image $I_{Grad}(x, y)$ of the input image using a Sobel operator, for example. Practically, the corresponding gradient image of the input image may also be calculated using other operators well-known in the art.

Subsequently, the first image converting unit 4202 may convert the gradient image of the image into a binarization image. For example, the first image converting unit 4202 may convert the gradient image $I_{Grad}(x, y)$ of the input image I(x, y) into a binarization image $\text{Mask}_{Grad}(x, y)$ using a global thresholding method:

$$\text{Mask}_{Grad}(x, y) = \begin{cases} 1, & I_{Grad}(x, y) > t \\ 0, & I_{Grad}(x, y) \le t \end{cases}, \quad (2)$$

practically, a threshold t may also be selected using other methods well-known in the art, or the gradient image may also be converted into the binarization image using other methods well-known in the art.

Then, the candidate picture connected region acquiring unit 4203 may perform a connected region analysis algorithm on the binarization image to obtain candidate picture connected regions. According to one embodiment of the present disclosure, for example on the above mentioned binarization image $\text{Mask}_{Grad}(x, y)$, the candidate picture connected region acquiring unit 4203 may locate connected regions of pixels $CC(1)_1, CC(1)_2, \ldots, CC(1)_n$ having a value "1" as candidate picture connected regions. A mark (1 to n) of the connected region where each pixel having the value "1" belongs to may be assigned to the pixel.

However, the located candidate picture connected regions may have different sizes. Generally, a candidate picture connected region with a greater size may be determined as the candidate picture region. Subsequently, the picture selecting unit 4204 may select a candidate picture connected region with a size (for example a height or a width) greater than a predetermined threshold as a picture region. In order to meet the size requirement of a defined connected region, the predetermined threshold may be set for a connected region (for example a height or a width of the connected region), and the predetermined threshold may be determined based on empirical values.

Figure 6:
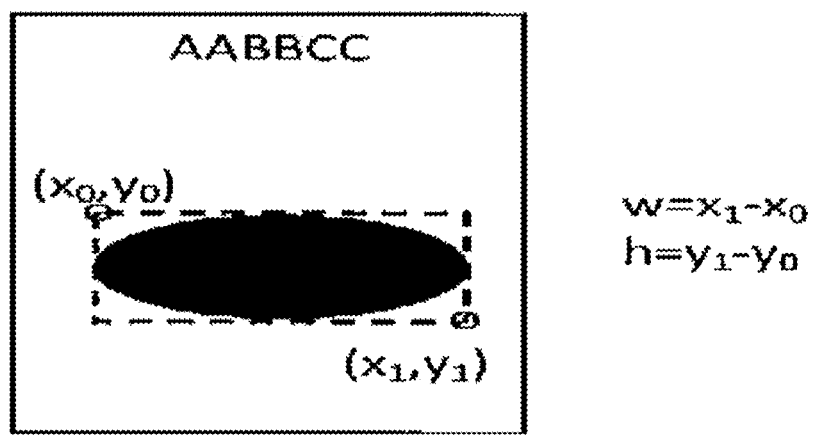
FIG. 6 schematically shows an enclosing rectangle of a connected region according to an embodiment of the present disclosure.

Then, the picture marking unit 4205 may mark a boundary of the picture region to separate the picture region from the non-picture region. According to one embodiment of the present disclosure, the picture marking unit 4205 may set, as foreground pixels (having a value "1"), pixels in an enclosing rectangle of the candidate picture connected region (i.e., the picture region) with a greater size, as shown in FIG. 6:

$$RMask_{Grad}(x, y) = \begin{cases} 1, & \text{if } x_0 \le x \le x_1, y = y_0 \text{ or } y_1; \\ & y_0 \le y \le y_1, x = x_0 \text{ or } x_1 \\ \text{Mask}_{Grad}(x, y), & \text{else} \end{cases} \quad (3)$$

where $x_0, y_0, x_1, y_1$ represent coordinates of the enclosing rectangle of the candidate picture connected region, i.e., a width w of the enclosing rectangle is $x_1 - x_0$, and a height h of the enclosing rectangle is $y_1 - y_0$.

Figure 7:
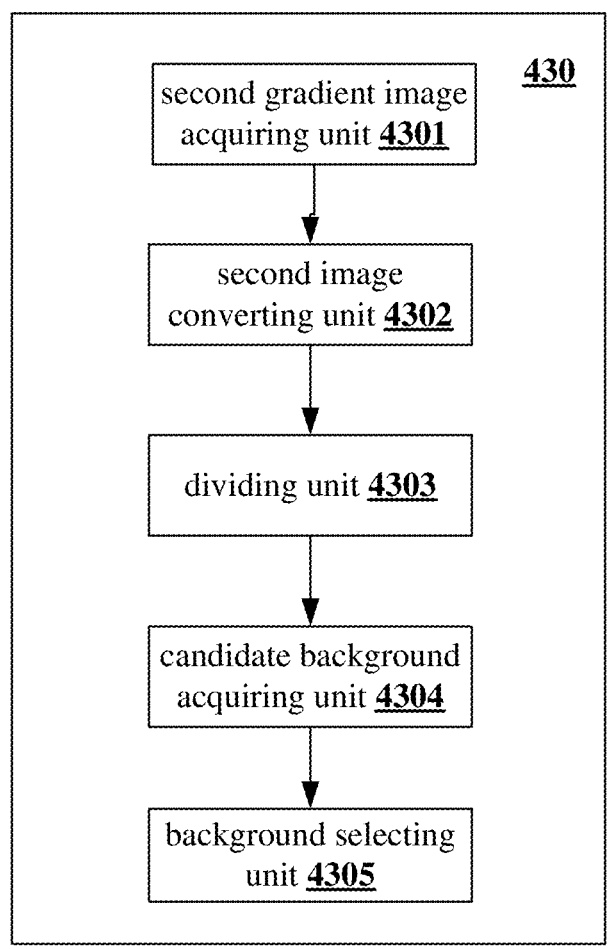
FIG. 7 is a block diagram of a part of an image processing device according to an embodiment of the present disclosure.

According to another embodiment of the present disclosure, as shown in FIG. 7, the background acquiring unit 430 may include a second gradient image acquiring unit 4301, a second image converting unit 4302, a dividing unit 4303, a candidate background acquiring unit 4304 and a background selecting unit 4305.

The second gradient image acquiring unit 4301 may be configured to acquire a gradient image of an image based on pixel information of the image. According to one embodiment of the present disclosure, for the above mentioned given input image I(x, y), the second gradient image acquiring unit 4301 may calculate a corresponding gradient image $I_{Grad}(x, y)$ of the input image using a Sobel operator. Similarly, the corresponding gradient image of the input image may also be calculated using other operators well-known in the art.

Subsequently, the second image converting unit 4302 may convert the gradient image of the image into a binarization image. According to one embodiment of the present disclosure, the second image converting unit 4302 may convert the gradient image $I_{Grad}(x, y)$ of the input image I(x, y) into the binarization image $\text{Mask}_{Grad}(x, y)$ using a global thresholding method for example. Similarly, the threshold t may also be selected using other methods well-known in the art, or the gradient image may also be converted into the binarization image using other methods well-known in the art.

Subsequently, the dividing unit 4303 may divide the binarization image of the image into a non-picture region and a picture region. According to one embodiment of the present disclosure, for example on the binarization image $\text{Mask}_{Grad}(x, y)$, the dividing unit 4303 may group connected regions $CC(1)_1, CC(1)_2, \ldots, CC(1)_n$ having a pixel value "1" as picture regions, and group connected regions $CC(0)_1, CC(0)_2, \ldots, CC(0)_n$ having a pixel value "0" as non-picture regions.

Then, the candidate background acquiring unit 4304 may perform a connected region analysis algorithm on the non-picture region and the picture-region to obtain a candidate background connected region of the non-picture region and a candidate background connected region of the picture region respectively. Generally, for the non-picture region, for example in the image $RMask_{Grad}(x, y)$, a pixel with a value "0" has a small gradient response, hence pixels with the value "0" will correspond to the non-picture region background pixels. According to one embodiment of the present disclosure, for example in the binarization image $RMask_{Grad}(x, y)$, the candidate background acquiring unit 4304 may locate connected regions $CC(0)_1, CC(0)_2, \ldots, CC(0)_n$ having a pixel value "0" in the non-picture region and the picture region, as candidate background connected regions of the non-picture region and candidate background connected regions of the picture region respectively. A mark (1 to n) of the connected region where each pixel having the value "0" belongs to may be assigned to the pixel.

In the embodiment, it may be assumed that the non-picture region and the picture region each has a background in a uniform color. Hence, each of the candidate background region of the non-picture region or the candidate background region of the picture region may be a connected region with a greater size.

Subsequently, the background selecting unit 4305 may select, as a non-picture background connected region of the non-picture region and a picture background connected region of the picture region respectively, a candidate background connected region with a maximum size in the non-picture region and a candidate background connected region with a maximum size in the picture region. According to one embodiment of the present disclosure, for the non-picture region, the candidate background connected region with the maximum size may be marked as a background connected region $CC_{bg}$:

$$CC(0)_{max} = \text{argmax}_{i=1,2,\ldots,n} \text{size}(CC(0)_i) \quad (4)$$

$$\text{size}(CC(0)_i) = w_{CC(0)_i} * h_{CC(0)_i} \quad (5),$$

where $\text{size}(CC(0)_i)$ represents the number of background pixels contained in the candidate background connected region $CC(0)_i$, and $w_{CC(0)_i}$ and $h_{CC(0)_i}$ represent the width and the height of the enclosing rectangle of the candidate background connected region respectively (as shown in FIG. 6).

Figure 8:
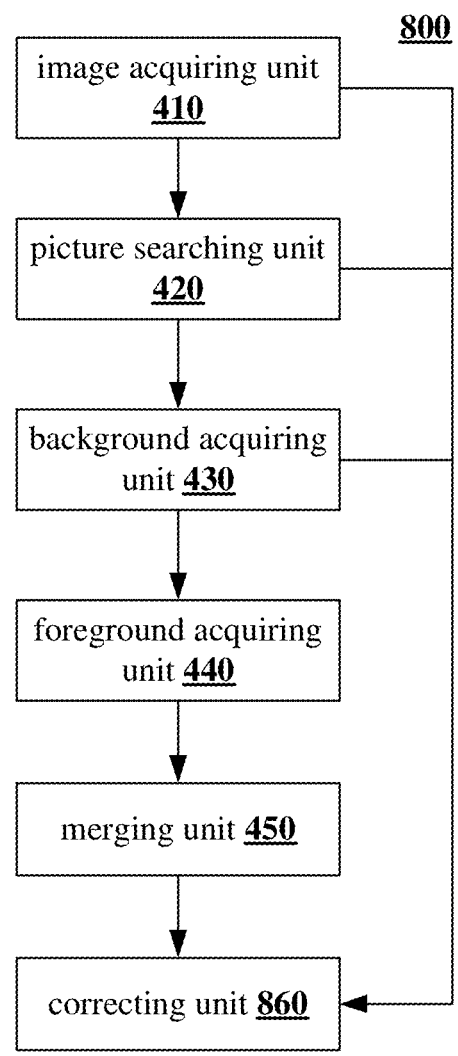
FIG. 8 is a block diagram of an image processing device according to another embodiment of the present disclosure.

In addition, it is to be recognized by those skilled in the art that since noise may exist in the foreground layer of the obtained file image, the foreground layer may be corrected. Therefore, an image processing device is provided according to another embodiment of the present disclosure. FIG. 8 shows the image processing device 800 according to another embodiment of the present disclosure. Besides a correcting unit 860, other components of the image processing device shown in FIG. 8 are the same as the respective components of the image processing device 400 shown in FIG. 4, which are not described here.

As shown in FIG. 8, in addition to the image acquiring unit 410, the picture searching unit 420, the background acquiring unit 430, the foreground acquiring unit 440 and the merging unit 450, the image processing device 800 may further include the correcting unit 860.

Figure 9:
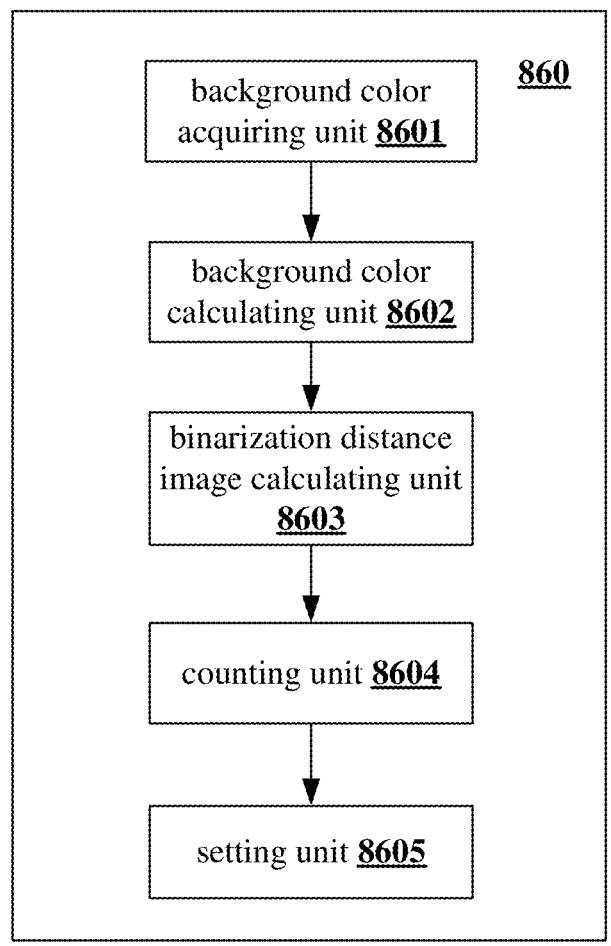
FIG. 9 is a block diagram of an image processing device according to an embodiment of the present disclosure.

As shown in FIG. 9, the correcting unit 860 may include a background color acquiring unit 8601, a background color calculating unit 8602, a binarization distance image calculating unit 8603, a counting unit 8604 and a setting unit 8605.

The background color acquiring unit 8601 may be configured to acquire a reference background color of an image based on information of non-picture background pixels in a non-picture background connected region of the image. For example, based on the non-picture background connected region $CC_{bg}$ obtained by the background acquiring unit 430, a color average value (i.e., the reference background color) of the non-picture background region may be estimated as:

$$\text{color}_{bg} = \frac{1}{n}\sum_{i=1}^{n} \text{color}(CC_{bg,i}). \quad (6)$$

Optionally, a color having a maximum frequency may be considered as the reference background color. Specifically, a color of each non-picture background pixel is qualified into bins (for example 0, 1, . . . , 31, in total 32 bins); then histograms $h_1, h_2, \ldots, h_d$ of each non-picture background pixel in these bins may be calculated, wherein an average color value of pixels in a bin with a maximum value may be considered as the reference background color.

Subsequently, the background color calculating unit 8602 may calculate a distance between a color of each of the pixels in an image and the reference background color of the image to obtain a distance map. According to one embodiment of the present disclosure, a distance image dist(x, y) may be calculated based on a color image of the input image I(x, y) and the reference background color obtained by the background color acquiring unit 8601:

$$\text{dist}(x,y)=|I(x,y)-\text{color}_{bg}| \quad (7),$$

where |•| represents an L1 (geometry) distance.

Then, the binarization distance image calculating unit 8603 may calculate a binarization distance image based on the distance map. According to one embodiment of the present disclosure, the binarization distance image calculating unit 8603 may obtain a distance binarization image (hereinafter also referred to as a template image) $\text{Mask}_{dist}(x, y)$ based on the distance image dist(x, y) calculated by the background color calculating unit 8602 using a global binarization method (such as the OTSU or Multi Otsu method by Nobuyuki Otsu), for example, $$\text{Mask}_{dist}(x, y) = \begin{cases} 1, \text{dist}(x, y) > t_2 \\ 0, \text{dist}(x, y) \le t_2 \end{cases}, \quad (8)$$

where $t_2$ is a threshold calculated using the OTSU algorithm. Practically, the binarization distance map may also be calculated using other methods well-known in the art. In the distance binarization image (the template image), pixels having a value "1" are foreground pixels with a high probability.

Subsequently, the counting unit 8604 may count the number of reference image foreground pixels of the binarization distance image within a certain range centered on the image foreground pixel. According to one embodiment of the present disclosure, in an initial foreground image $\text{Mask}_{fore,init}$, the counting unit 8604 may count the number of reference foreground pixels of the template image $\text{Mask}_{dist}$ within a certain range centered on an initial image foreground pixel. Optionally, for each connected region in the initial image foreground region, the counting unit 8604 may calculate the number of reference image foreground pixels contained in a corresponding region in the template image $\text{Mask}_{dist}$:

$$\text{NUM}_{fore}(CC_i)=\#\{\text{Mask}_{dist}(x,y)=1\}, x_0 \le x \le x_1, y_0 \le y \le y_1 \quad (9),$$

where $x_0$, $y_0$, $x_1$ and $y_1$ represent coordinates of an enclosing rectangle of the connected region $CC(0)_i$.

Subsequently, the setting unit 8605 may set, as background pixels of the image, the image foreground pixels of which the number of the reference image foreground pixels is less than a second predetermined threshold. According to the embodiment, if a value of $\text{Num}_{fore}(CC_i)$ is less than the second predetermined threshold, the connected region is considered to be invalid. That is, for all the connected regions determined to be invalid, foreground pixels of these connected regions are set as background pixels, thereby obtaining an ultimate foreground pixel layer.

Figure 12A:
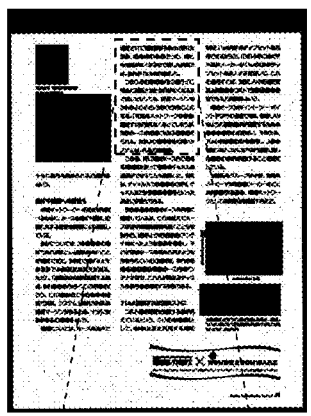
FIG. 12A schematically shows an initial foreground pixel layer.
Figure 12B:
FIG. 12B schematically shows a binarization distance image for the initial foreground pixel layer shown in FIG. 12A.
Figure 12C:
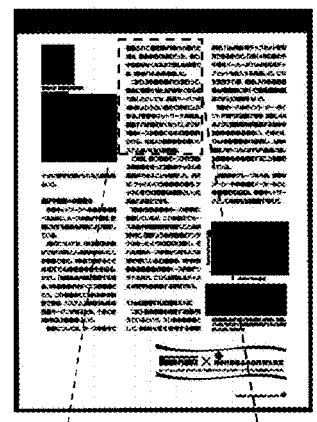
FIG. 12C schematically shows an ultimate foreground image layer for the initial foreground pixel layer shown in FIG. 12A.

FIG. 12A, FIG. 12B and FIG. 12C schematically show an initial foreground pixel layer $\text{Mask}_{fore,init}$, a binarization distance image for the initial foreground pixel layer $\text{Mask}_{fore,init}$ shown in FIG. 12A and an ultimate foreground pixel layer $\text{Mask}_{fore}$ for the initial foreground pixel layer $\text{Mask}_{fore,init}$ shown in FIG. 12A respectively.

Figure 13:
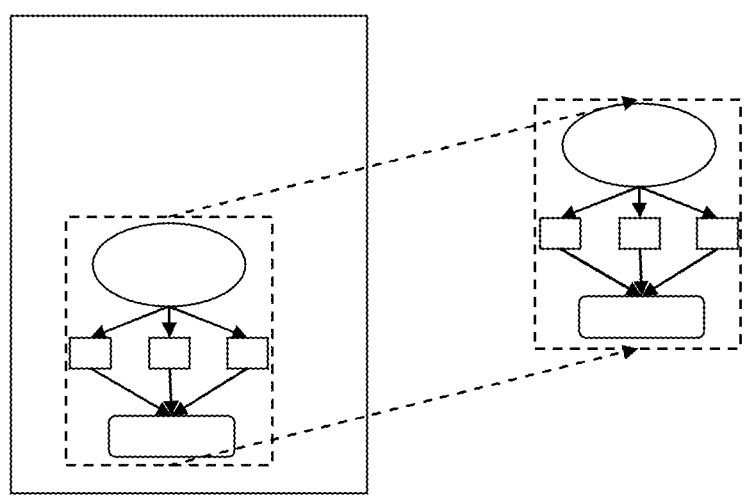
FIG. 13 schematically shows an image block cropped from an original image.

In addition, for those picture regions, each of the picture regions may be processed by taking the picture region as a single image. As shown in FIG. 13, a flowchart in the image corresponds to a large connected region and is cropped from an original image. A method similar to the previously mentioned method of extracting a non-picture foreground layer is applied to the image block to extract a foreground layer of the image block.

With the image processing device 800 shown in FIG. 8, a file image may be divided into a picture region and a non-picture region, then the background layer of the picture region and the background layer of the non-picture region are located. After the background layer is detected, the background layer is removed, thereby obtaining an initial foreground layer of the file image. Lastly, an ultimate foreground layer image is obtained by removing small noise from the initial foreground layer of the file, thereby solving a problem that it is difficult to extract a foreground layer of a picture region since the file has multiple types of colors and complicated picture regions.

Figure 10:
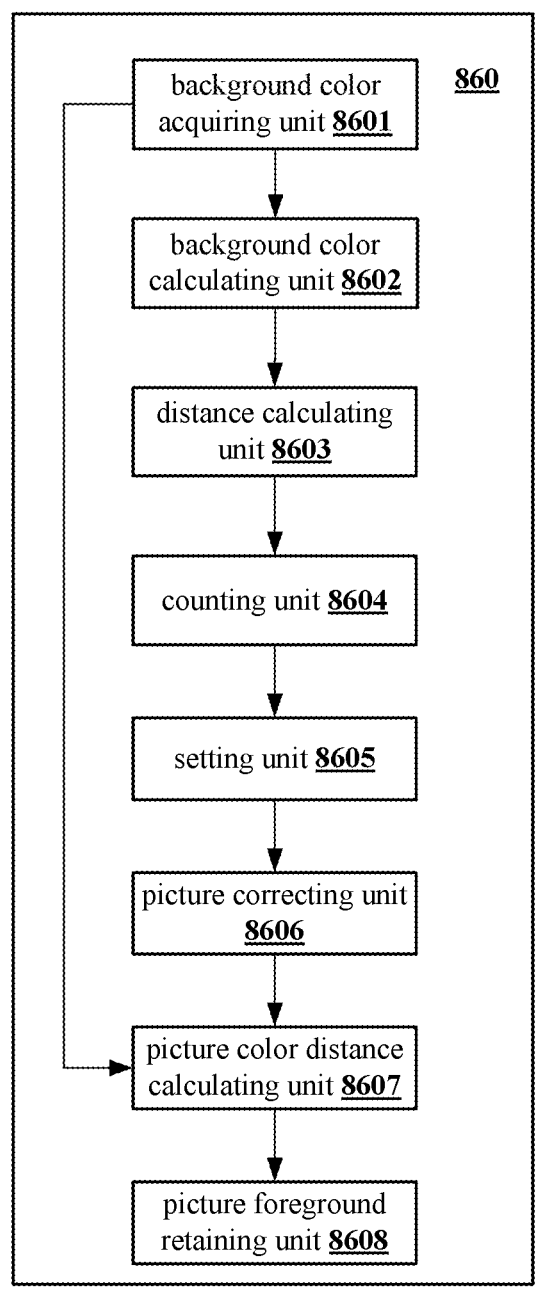
FIG. 10 is a block diagram of a part of an image processing device according to an embodiment of the present disclosure.

According to another embodiment of the present disclosure, as shown in FIG. 10, the correcting unit 860 may further include a picture correcting unit 8606, a picture color distance calculating unit 8607 and a picture foreground retaining unit 8608.

The picture correcting unit 8606 may be configured to acquire a background color of a picture region based on information of picture background pixels in a picture background connected region.

Then, the picture color distance calculating unit 8607 may calculate a distance between a background color of the picture region and a reference background color of the image to obtain a background color distance. According to the embodiment, it is assumed that the background color of the picture region is marked as $color_{bg,k}$, the picture color distance calculating unit 8607 may calculate a distance between the background color $color_{bg,k}$ of the picture region and the reference background color $color_{bg}$ of the image:

$$\text{dif} = |color_{bg,k} - color_{bg}| \quad (10).$$

Subsequently, the picture foreground retaining unit 8608 may retain the whole picture region as a picture foreground region of the picture region, in a case that the background color distance is greater than a threshold. That is to say, according to the embodiment, if a value of dif exceeds the set threshold, it indicates that the background color of the candidate picture region is different from the background color of the whole image, hence the whole candidate picture region is retained; otherwise, a method similar to the above foreground extracting method is used to extract the foreground of the candidate picture region.

Figure 11:
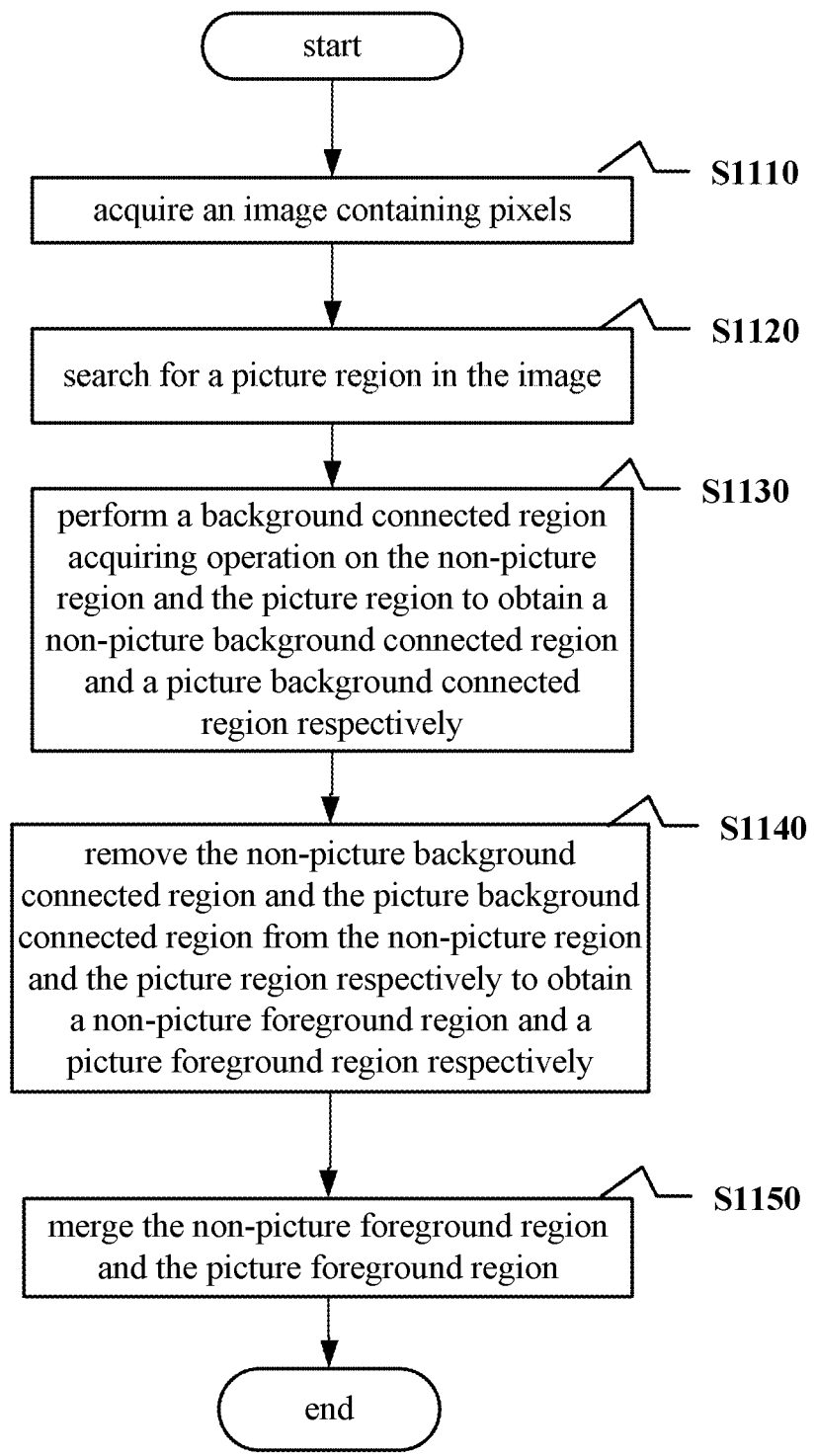
FIG. 11 is a flowchart of an image processing method according to an embodiment of the present disclosure.

An image processing method according to an embodiment of the present disclosure is described in conjunction with FIG. 11. As shown in FIG. 11, the image processing method according to the embodiment of the present disclosure starts with step S1110. In step S1110, an image containing pixels is acquired.

Subsequently, in step S1120, a picture region is searched for in the image.

Subsequently, in step S1130, a background connected region acquiring operation is performed on a non-picture region of the image in which the picture region is not included and the picture region, to obtain a non-picture background connected region and a picture background connected region respectively. Each of the pixels in the non-picture background connected region is defined as a non-picture background pixel, and each of the pixels in the picture background connected region is defined as a picture background pixel.

Subsequently, in step S1140, the non-picture background connected region and the picture background connected region are removed respectively from the non-picture region and the picture region, to obtain a non-picture foreground region of the non-picture region and a picture foreground region of the picture region respectively. Each of the pixels in the non-picture foreground region is defined as a non-picture foreground pixel, and each of the pixels in the picture foreground region is defined as a picture foreground pixel.

Subsequently, in step S1150, the non-picture foreground region of the non-picture region and the picture foreground region of the picture region are merged to obtain an ultimate image foreground region. Each of the pixels in the image foreground region is defined as an image foreground pixel. After step S1150, the method ends.

According to another embodiment of the present disclosure, the method may further include: searching for a picture region in the image. The searching for a picture region in the image may include the following steps: acquiring a gradient image of the image based on pixel information of the image; converting the gradient image of the image into a binarization image; performing a connected region analysis algorithm on the binarization image to obtain candidate picture connected regions; selecting, as the picture region, a candidate picture connected region with a size greater than a first predetermined threshold; and marking a boundary of the picture region to separate the picture region from the non-picture region.

According to another embodiment of the present disclosure, the process of acquiring may further include: acquiring a gradient image of the image based on pixel information of the image; converting the gradient image of the image into a binarization image; dividing the binarization image of the image into the non-picture region and the picture region; performing a connected region analysis algorithm on the non-picture region and the picture region, to obtain candidate background connected regions of the non-picture region and candidate background connected regions of the picture region respectively; and selecting, as a non-picture background connected region of the non-picture region and a picture background connected region of the picture region respectively, a candidate background connected region with a maximum size in the non-picture region and a candidate background connected region with a maximum size in the picture region.

According to another embodiment of the present disclosure, a step of correcting may also be performed. The correcting may include: acquiring a background color of the image based on information of non-picture background pixels in the non-picture background connected region of the image; calculating a distance between a color of each of the pixels in the image and the background color of the image to obtain a distance map; calculating a binarization distance image based on the distance map; counting the number of reference image foreground pixels of the binarization distance image within a certain range centered on the image foreground pixel; and setting, as background pixels of the image, the image foreground pixels of which the number of the reference image foreground pixels is less than a second predetermined threshold.

According to another embodiment of the present disclosure, the correcting may further include: acquiring a background color of the picture region based on information of picture background pixels in the picture background connected region; calculating a distance between the background color of the picture region and the reference background color of the image to obtain a background color distance; and retaining the whole picture region as the picture foreground region of the picture region, in a case that the background color distance is greater than a threshold.

According to another embodiment of the present disclosure, the process of acquiring a background color of an image may include: quantifying a color of each non-picture background pixel into bins; calculating a histogram of each non-picture background pixel in a corresponding bin; and selecting, as the reference background color of the image, an average color value of pixels in a bin with a maximum value.

The various specific implementations of the above steps of the image processing method according to the embodiments of the present disclosure have been described in detail previously, and therefore the explanations thereof will not be repeated herein.

Apparently, respective operating processes of the image processing method according to the present disclosure can be implemented in a manner of a computer executable program stored on a machine-readable storage medium.

And, the object of the present disclosure can be implemented in a manner that the storage medium on which the computer executable program above is carried is provided directly or indirectly to a system or apparatus, a computer or a Central Processing Unit (CPU) of which reads out and executes the computer executable program. Here, the implementation of the present disclosure is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information.

Additionally, the present disclosure can also be implemented by connecting to a corresponding web site on the Internet through a computer, downloading and installing the computer executable program according to the invention into the computer, and then executing the program.

Figure 14:
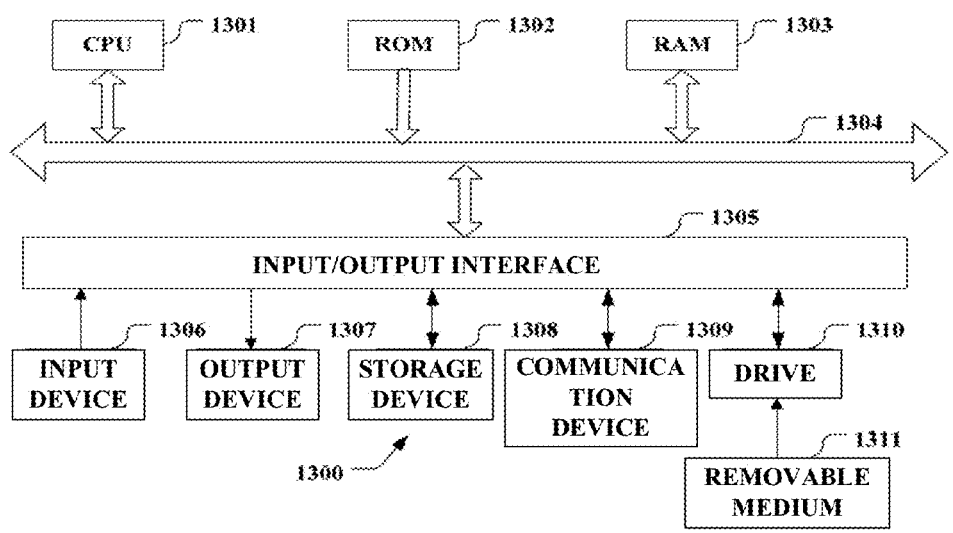
FIG. 14 is a schematic structural block diagram of a general-purpose personal computer in which the image processing device and the image processing method according to an embodiment of the present disclosure may be implemented.

FIG. 14 is a block diagram illustrating an exemplary structure of a general-purpose personal computer on which the image processing device and method according to the embodiments of the present disclosure can be implemented.

As shown in FIG. 14, a CPU 1301 executes various processing according to a program stored in a Read Only Memory (ROM) 1302 or a program loaded to a Random Access Memory (RAM) 1303 from a storage device 1308. In the RAM 1303, if necessary, data required for the CPU 1301 in executing various processing and the like is also stored. The CPU 1301, the ROM 1302 and the RAM 1303 are connected to each other via a bus 1304. An input/output interface 1305 is also connected to the bus 1304.

The following components are connected to the input/output interface 1305: an input device 1306 including a keyboard, a mouse and the like, an output device 1307 including a display such as a Cathode Ray Tube (CRT) and a Liquid Crystal Display (LCD), a speaker and the like, the storage device 1308 including a hard disk and the like, and a communication device 1309 including a network interface card such as a LAN card, a modem and the like. The communication device 1309 performs communication processing via a network such as the Internet. If necessary, a drive 1310 can also be connected to the input/output interface 1305. A removable medium 1311 such as a magnetic disk, an optical disk, a magneto-optical disk, a semiconductor memory and the like is mounted on the drive 1310 as necessary such that a computer program read out therefrom is installed in the storage device 1308.

In a case that the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 14 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage device 1308 or the like. Herein, the program is stored in the storage medium, and the storage medium is distributed to the user together with the device containing the storage medium.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiment of the present disclosure has been described in detail in combination with the drawings above, it should be understood that, the embodiment described above is only used to explain the invention and is not constructed as the limitation to the present disclosure. For those skilled in the art, various modification and alternation can be made to the above embodiment without departing from the essential and scope of the present disclosure. Therefore, the scope of the present disclosure is only defined by the appended claims and the equivalents thereof.

For the implementing ways including the above embodiments, the following items are further disclosed.

Item 1. An image processing device, comprising:
an image acquiring unit configured to acquire an image containing pixels;
a picture searching unit configured to search for a picture region in the image;
a background acquiring unit configured to perform a background connected region acquiring operation on a non-picture region of the image in which the picture region is not included and the picture region, to obtain a non-picture background connected region and a picture background connected region respectively, wherein each of the pixels in the non-picture background connected region is defined as a non-picture background pixel, and each of the pixels in the picture background connected region is defined as a picture background pixel;
a foreground acquiring unit configured to remove the non-picture background connected region and the picture background connected region from the non-picture region and the picture region respectively, to obtain a non-picture foreground region of the non-picture region and a picture foreground region of the picture region respectively, wherein each of the pixels in the non-picture foreground region is defined as a non-picture foreground pixel, and each of the pixels in the picture foreground region is defined as a picture foreground pixel; and
a merging unit configured to merge the non-picture foreground region of the non-picture region and the picture foreground region of the picture region to obtain an ultimate image foreground region, wherein each of the pixels in the image foreground region is defined as an image foreground pixel.

Item 2. The device according to item 1, wherein the picture searching unit comprises:
a first gradient image acquiring unit configured to acquire a gradient image of the image based on pixel information of the image;
a first image converting unit configured to convert the gradient image of the image into a binarization image;

a candidate picture connected region acquiring unit configured to perform a connected region analysis algorithm on the binarization image to obtain candidate picture connected regions;

a picture selecting unit configured to select, as the picture region, a candidate picture connected region with a size greater than a first predetermined threshold; and a picture marking unit configured to mark a boundary of the picture region to separate the picture region from the non-picture region.

Item 3. The device according to item 1, wherein the background acquiring unit comprises:

a second gradient image acquiring unit configured to acquire a gradient image of the image based on pixel information of the image;

a second image converting unit configured to convert the gradient image of the image into a binarization image;

a dividing unit configured to divide the binarization image of the image into the non-picture region and the picture region;

a candidate background acquiring unit configured to perform a connected region analysis algorithm on the non-picture region and the picture region to obtain candidate background connected regions of the non-picture region and candidate background connected regions of the picture region respectively; and a background selecting unit configured to select, as a non-picture background connected region of the non-picture region and a picture background connected region of the picture region respectively, a candidate background connected region with a maximum size in the non-picture region and a candidate background connected region with a maximum size in the picture region.

Item 4. The device according to any one of items 1 to 3, further comprising a correcting unit, wherein the correcting unit comprises:

a background color acquiring unit configured to acquire a reference background color of the image based on information of non-picture background pixels in the non-picture background connected region of the image;

a background color calculating unit configured to calculate a distance between a color of each of the pixels in the image and the reference background color of the image to obtain a distance map;

a binarization distance image calculating unit configured to calculate a binarization distance image based on the distance map;

a counting unit configured to count the number of reference image foreground pixels of the binarization distance image within a certain range centered on the image foreground pixel; and a setting unit configured to set, as background pixels of the image, the image foreground pixels of which the number of the reference image foreground pixels is less than a second predetermined threshold.

Item 5. The device according to item 4, wherein the correcting unit further comprises:

a picture correcting unit configured to acquire a background color of the picture region based on information of picture background pixels in the picture background connected region;

a picture color distance calculating unit configured to calculate a distance between a background color of the picture region and the reference background color of the image to obtain a background color distance; and a picture foreground retaining unit configured to retain the whole picture region as the picture foreground region of the picture region, in a case that the background color distance is greater than a threshold.

Item 6. The device according to item 4, wherein the background color acquiring unit comprises:

a color quantifying unit configured to quantify a color of each non-picture background pixel into bins;

a histogram calculating unit configured to calculate a histogram of each non-picture background pixel in a corresponding bin; and a color selecting unit configured to select, as the reference background color of the image, an average color value of pixels in a bin with a maximum value.

Item 7. The device according to item 4, wherein the counting unit is configured to calculate, for each connected region in the image foreground region, the number of the reference image foreground pixels contained in a corresponding region in the binarization distance image.

Item 8. The device according to item 4, wherein the binarization distance image calculating unit is configured to calculate the binarization distance image using an OTSU algorithm.

Item 9. The device according to item 1, wherein the non-picture region and the picture region each has a background in a uniform color.

Item 10. An image processing method, comprising:

acquiring an image containing pixels;

searching for a picture region in the image;

performing a background connected region acquiring operation on a non-picture region of the image in which the picture region is not included and the picture region, to obtain a non-picture background connected region and a picture background connected region respectively, wherein each of the pixels in the non-picture background connected region is defined as a non-picture background pixel, and each of the pixels in the picture background connected region is defined as a picture background pixel;

removing the non-picture background connected region and the picture background connected region from the non-picture region and the picture region respectively, to obtain a non-picture foreground region of the non-picture region and a picture foreground region of the picture region respectively, wherein each of the pixels in the non-picture foreground region is defined as a non-picture foreground pixel, and each of the pixels in the picture foreground region is defined as a picture foreground pixel; and merging the non-picture foreground region of the non-picture region and the picture foreground region of the picture region to obtain an ultimate image foreground region, wherein each of the pixels in the image foreground region is defined as an image foreground pixel.

Item 11. The method according item 10, wherein the searching for a picture region in the image comprises:

acquiring a gradient image of the image based on pixel information of the image;

converting the gradient image of the image into a binarization image;

performing a connected region analysis algorithm on the binarization image to obtain candidate picture connected regions;

selecting, as the picture region, a candidate picture connected region with a size greater than a first predetermined threshold; and marking a boundary of the picture region to separate the picture region from the non-picture region.

Item 12. The method according to item 10, wherein the acquiring an image containing pixels further comprises:
 acquiring a gradient image of the image based on pixel information of the image;
 converting the gradient image of the image into a binarization image;
 dividing the binarization image of the image into the non-picture region and the picture region;
 performing a connected region analysis algorithm on the non-picture region and the picture region, to obtain candidate background connected regions of the non-picture region and candidate background connected regions of the picture region respectively; and
 selecting, as a non-picture background connected region of the non-picture region and a picture background connected region of the picture region respectively, a candidate background connected region with a maximum size in the non-picture region and a candidate background connected region with a maximum size in the picture region.

Item 13. The method according to any one of items 10 to 12, further comprising correcting, wherein the correcting comprises:
 acquiring a background color of the image based on information of non-picture background pixels in the non-picture background connected region of the image;
 calculating a distance between a color of each of the pixels in the image and the background color of the image to obtain a distance map;
 calculating a binarization distance image based on the distance map;
 counting the number of reference image foreground pixels of the binarization distance image within a certain range centered on the image foreground pixel; and
 setting, as background pixels of the image, the image foreground pixels of which the number of the reference image foreground pixels is less than a second predetermined threshold.

Item 14. The method according to item 13, wherein the correcting further comprises:
 acquiring a background color of the picture region based on information of picture background pixels in the picture background connected region;
 calculating a distance between a background color of the picture region and the reference background color of the image as a background color distance; and
 retaining the whole picture region as the picture foreground region of the picture region, in a case that the background color distance is greater than a threshold.

Item 15. The method according to item 13, wherein the acquiring a background color of the image comprises:
 quantifying a color of each non-picture background pixel into bins;
 calculating a histogram of each non-picture background pixel in a corresponding bin; and
 selecting, as the reference background color of the image, an average color value of pixels in a bin with a maximum value.

Item 16. The method according to claim 13, wherein for each connected region in the image foreground region, the number of reference image foreground pixels contained in a corresponding region in the binarization distance image is calculated.

Item 17. The method according to item 13, wherein a binarization distance image is calculated using an OTSU algorithm.

Item 18. The method according to item 10, wherein the non-picture region and the picture region each has a background in a uniform color.

Item 19. A machine readable non-transitory storage medium on which a program product comprising machine readable instruction code is carried, wherein the instruction code, when read and executed by a computer, causes the computer to perform the method according to any one of items 10 to 18.

The invention claimed is:

1. An image processing device, comprising:
 a processor configured to
 acquire an image containing pixels;
 search for a picture region in the image;
 perform a background connected region acquiring operation on a non-picture region of the image in which the picture region is not included and the picture region;
 obtain a non-picture background connected region and a picture background connected region, respectively, wherein each of the pixels in the non-picture background connected region is defined as a non-picture background pixel, and each of the pixels in the picture background connected region is defined as a picture background pixel;
 remove the non-picture background connected region and the picture background connected region from the non-picture region and the picture region respectively;
 obtain a non-picture foreground region of the non-picture region and a picture foreground region of the picture region respectively, wherein each of the pixels in the non-picture foreground region is defined as a non-picture foreground pixel, and each of the pixels in the picture foreground region is defined as a picture foreground pixel; and
 merge the non-picture foreground region of the non-picture region and the picture foreground region of the picture region to obtain an ultimate image foreground region, wherein each of the pixels in the image foreground region is defined as an image foreground pixel.

2. The device according to claim 1, the processor further configured to
 acquire a gradient image of the image based on pixel information of the image;
 convert the gradient image of the image into a binarization image;
 perform a connected region analysis algorithm on the binarization image to obtain candidate picture connected regions;
 select, as the picture region, a candidate picture connected region with a size greater than a first predetermined threshold; and
 mark a boundary of the picture region to separate the picture region from the non-picture region.

3. The device according to claim 1, the processor further configured to
 acquire a gradient image of the image based on pixel information of the image;
 convert the gradient image of the image into a binarization image;
 divide the binarization image of the image into the non-picture region and the picture region;
 perform a connected region analysis algorithm on the non-picture region and the picture region to obtain candidate background connected regions of the non-picture region and candidate background connected regions of the picture region, respectively; and select, as a non-picture background connected region of the non-picture region and a picture background connected region of the picture region, respectively, a candidate background connected region with a first maximum size in the non-picture region and a candidate background connected region with a second maximum size in the picture region.

4. The device according to claim 1, the processor further configured acquire a reference background color of the image based on information of non-picture background pixels in the non-picture background connected region of the image;

calculate a first distance between a color of each of the pixels in the image and the reference background color of the image to obtain a distance map;

configured to calculate a binarization distance image based on the distance map;

count a number of reference image foreground pixels of the binarization distance image within a certain range centered on the image foreground pixel; and set, as background pixels of the image, the image foreground pixels of which the number of the reference image foreground pixels is less than a second predetermined threshold.

5. The device according to claim 4, the processor further configured acquire a background color of the picture region based on information of picture background pixels in the picture background connected region;

calculate a second distance between a background color of the picture region and the reference background color of the image to obtain a background color distance; and retain the entire picture region as the picture foreground region of the picture region, when the background color distance is greater than a third predetermined threshold.

6. The device according to claim 4, the processor further configured to quantify a color of each non-picture background pixel into bins;

calculate a histogram of each non-picture background pixel in a corresponding bin of the bins; and select, as the reference background color of the image, an average color value of pixels in one of the bins with a maximum value.

7. The device according to claim 4, wherein the counting is configured to calculate, for each connected region in the image foreground region, the number of the reference image foreground pixels contained in a corresponding region in the binarization distance image.

8. The device according to claim 4, wherein the binarization distance image calculating is configured to calculate the binarization distance image using an OTSU algorithm (Multi Otsu method by Nobuyuki Otsu).

9. The device according to claim 1, wherein the non-picture region and the picture region each has a background in a uniform color.

10. An image processing method, comprising:
acquiring an image containing pixels;
searching for a picture region in the image;
performing a background connected region acquiring operation on a non-picture region of the image in which the picture region is not included and the picture region, to obtain a non-picture background connected region and a picture background connected region, respectively, wherein each of the pixels in the non-picture background connected region is defined as a non-picture background pixel, and each of the pixels in the picture background connected region is defined as a picture background pixel;

removing the non-picture background connected region and the picture background connected region from the non-picture region and the picture region respectively, to obtain a non-picture foreground region of the non-picture region and a picture foreground region of the picture region respectively, wherein each of the pixels in the non-picture foreground region is defined as a non-picture foreground pixel, and each of the pixels in the picture foreground region is defined as a picture foreground pixel; and merging the non-picture foreground region of the non-picture region and the picture foreground region of the picture region to obtain an ultimate image foreground region, wherein each of the pixels in the image foreground region is defined as an image foreground pixel.

11. The method according claim 10, wherein the searching for a picture region in the image comprises:
acquiring a gradient image of the image based on pixel information of the image;
converting the gradient image of the image into a binarization image;
performing a connected region analysis algorithm on the binarization image to obtain candidate picture connected regions;
selecting, as the picture region, a candidate picture connected region with a size greater than a first predetermined threshold; and
marking a boundary of the picture region to separate the picture region from the non-picture region.

12. The method according to claim 10, wherein the acquiring an image containing pixels further comprises:
acquiring a gradient image of the image based on pixel information of the image;
converting the gradient image of the image into a binarization image;
dividing the binarization image of the image into the non-picture region and the picture region;
performing a connected region analysis algorithm on the non-picture region and the picture region, to obtain candidate background connected regions of the non-picture region and candidate background connected regions of the picture region, respectively; and
selecting, as a non-picture background connected region of the non-picture region and a picture background connected region of the picture region, respectively, a candidate background connected region with a first maximum size in the non-picture region and a candidate background connected region with a second maximum size in the picture region.

13. The method according to claim 10, further comprising correcting, wherein the correcting comprises:
acquiring a background color of the image based on information of non-picture background pixels in the non-picture background connected region of the image;
calculating a distance between a color of each of the pixels in the image and the background color of the image to obtain a distance map;
calculating a binarization distance image based on the distance map;
counting a number of reference image foreground pixels of the binarization distance image within a certain range centered on the image foreground pixel; and setting, as background pixels of the image, the image foreground pixels of which the number of the reference image foreground pixels is less than a second predetermined threshold.

14. The method according to claim 13, wherein the correcting further comprises:

acquiring a background color of the picture region based on information of picture background pixels in the picture background connected region;

calculating a distance between a background color of the picture region and the reference background color of the image as a background color distance; and retaining the whole picture region as the picture foreground region of the picture region, when the background color distance is greater than a threshold.

15. The method according to claim 13, wherein the acquiring a background color of the image comprises:

quantifying a color of each non-picture background pixel into bins;

calculating a histogram of each non-picture background pixel in a corresponding bin of the bins; and selecting, as the reference background color of the image, an average color value of pixels in one of the bins with a maximum value.

16. The method according to claim 13, wherein for each connected region in the image foreground region, the number of reference image foreground pixels contained in a corresponding region in the binarization distance image is calculated.

17. The method according to claim 13, wherein a binarization distance image is calculated using an OTSU algorithm (Multi Otsu method by Nobuyuki Otsu).

18. The method according to claim 10, wherein the non-picture region and the picture region each has a background in a uniform color.

19. A machine readable non-transitory storage medium on which a program product comprising machine readable instruction code is carried, wherein the instruction code, when read and executed by a computer, causes the computer to perform the method according to claim 10.

* * * * *